United States Patent [19]

Kikuchi

[11] Patent Number: 4,712,114

[45] Date of Patent: Dec. 8, 1987

[54] LABEL FEEDING APPARATUS FOR A THERMAL LABEL PRINTER

[75] Inventor: Hidenori Kikuchi, Iwate, Japan

[73] Assignee: Kabushiki Kaisha Sato, Japan

[21] Appl. No.: 912,794

[22] Filed: Sep. 26, 1986

[30] Foreign Application Priority Data

Sep. 28, 1985 [JP] Japan ................................ 60-213668

[51] Int. Cl.⁴ ......................... G01D 15/10; B65C 9/18; B41J 3/20; B65H 43/04

[52] U.S. Cl. ................................ 346/76 PH; 346/136; 101/93.04; 101/66; 101/288; 156/384; 156/577; 156/579; 156/DIG. 47; 156/DIG. 49; 156/DIG. 51; 235/385; 235/432; 235/487; 235/488; 271/198; 271/303; 271/307; 400/73; 400/103; 400/120; 400/613.1

[58] Field of Search .......................... 346/76 PH, 136; 235/385, 432, 487, 488; 101/93.04, 66, 288; 156/384, 577, 579, DIG. 47, DIG. 49, DIG. 51; 400/73, 103, 120, 613.1; 271/198, 303, 307

[56] References Cited

U.S. PATENT DOCUMENTS

| | | | |
|---|---|---|---|
| 4,560,087 | 12/1985 | Sato et al. | 221/73 X |
| 4,578,140 | 3/1986 | Nakajima | 156/384 |
| 4,580,144 | 4/1986 | Cacui | 346/76 PH |
| 4,591,404 | 5/1986 | Hamisch, Jr. | 156/384 |

*Primary Examiner*—E. A. Goldberg
*Assistant Examiner*—Gerald E. Preston
*Attorney, Agent, or Firm*—Ostrolenk, Faber, Gerb & Soffen

[57] ABSTRACT

A thermal label printer is provided with a label feeding mechanism which is adapted to operate either in a first mode in which the printer supplies peeled labels or in a second mode in which the printed labels are delivered while still adhered to their backing sheet. The labels are delivered out of the printer on a conveyor belt which extends to a label peeling member in the printer. The conveyor belt is tiltable in a manner which is effective to create a larger clearance between the conveyor belt and the peeling member to facilitate loading of the backing sheet prior to beginning printing operations.

13 Claims, 6 Drawing Figures

LABEL FEEDING APPARATUS FOR A THERMAL LABEL PRINTER

BACKGROUND AND SUMMARY OF THE INVENTION

This invention relates to a thermal label printer having a label feeding device, and more particularly to the label feeding device adapted for printing relatively large labels, tags, papers and the like.

It is an object of the present invention to provide a label feed device for a thermal label printer which facilitates the task of changing over between feeding labels that have been peeled from their backing sheet and feeding labels which remain on the backing sheet.

In the label feed device of the present invention the foregoing and other objects are realized with a conveyor belt means which is located adjacent to a backing sheet redirecting and peeling member of the thermal printer. The conveyor belt means are designed to convey the printed labels out of the printer. In a unique fashion, the conveyor belt means can be pivoted to an open position to create a larger clearance between the conveyor and the peeling member to facilitate loading of the backing sheet.

Other features and advantages of the present invention will become apparent from the following description of the invention which refers to the following drawings.

DESCRIPTION OF A PREFERRED EMBODIMENT

Figure 1:
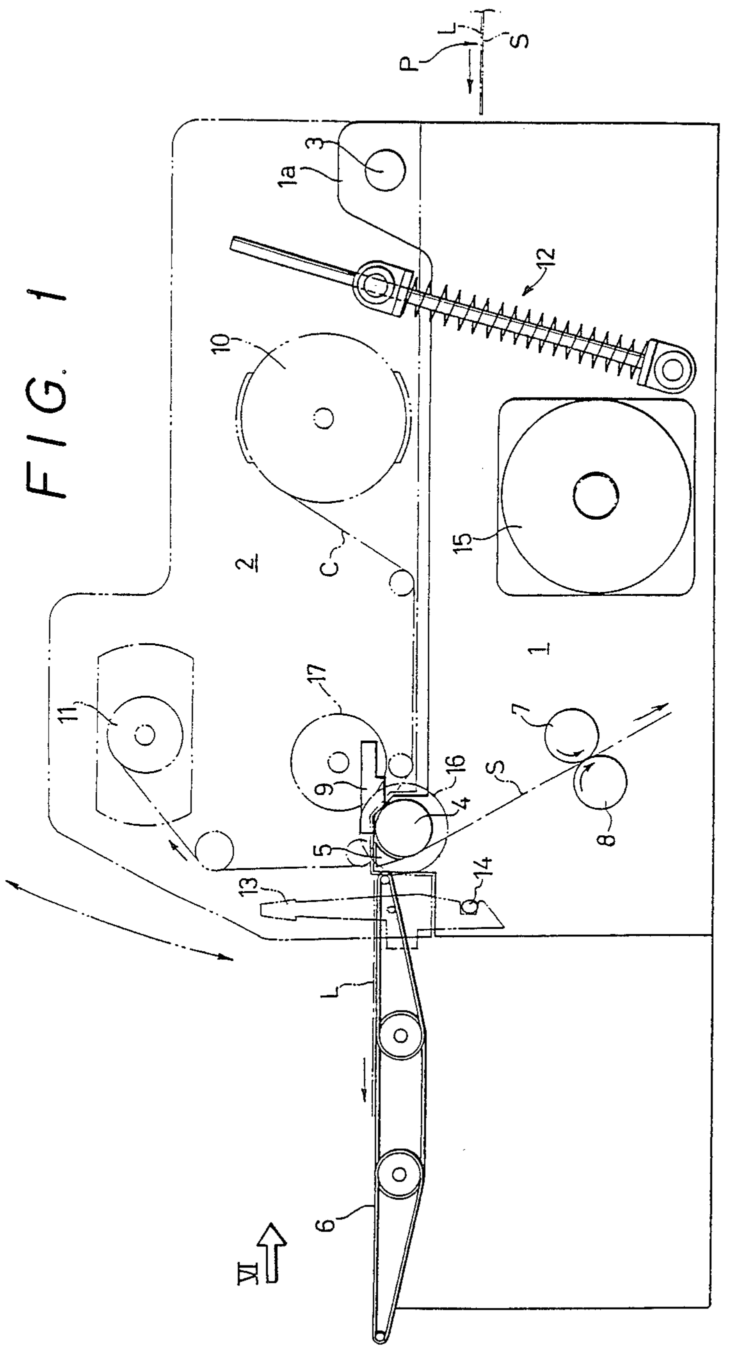
FIG. 1 is a simplified view which shows the overall construction of an embodiment of the present invention.

Referring to FIG. 1, a main unit of a thermal printer according to the invention comprises a fixed section 1 (represented by solid lines), usually placed on a desk-top or the like, and an openable cover 2 (in phantom lines) disposed over fixed section 1. Cover 2 is attached to fixed section 1 and swings about pivots 3 which are provided on rectangular raised portions 1*a* located at each side of the rear portion of fixed section 1.

Fixed section 1 supports a platen 4 and, in front of platen 4, a label peeling member 5 and a label conveyor belt 6. The top of cover section 2 is open to allow ready inspection of and access to the interior of the thermal printer.

Label strip P is formed of a backing sheet S, a separating agent layer on sheet S and a plurality of detachable labels L sequentially adhered to the backing sheet along the length thereof. A pressure-sensitive adhesive on one face of the labels permit labels L to adhere to backing sheet S. Label strip P is loaded into fixed section 1 from the rear thereof.

Label strip P is conveyed past platen 4 and label peeling member 5, the latter of which causes labels L to be peeled off backing sheet S and placed onto label conveyor belt 6. Note that the travel direction of backing sheet S changes by more than 90° as the sheet travels past peeling member 5. Backing sheet S thereafter passes between drive support roller 7 and follower support roller 8 which pull the backing sheet along by capstan action.

Cover 2 supports thermal print head 9 which is positioned to print data on labels L as they pass by. Thermal label strip P and carbon ribbon C are disposed to pass between thermal print head 9 and platen 4. Cover 2 also supports pay-out means 10 and take-up means 11 which, respectively, supply and take-up carbon ribbon C. Pay-out and take-up means 10 and 11 can take any form which is suitable for handling a strip-shaped roll of carbon ribbon C.

Cover 2 is biased to swing open about pivots 3 by open-urging means 12. During printing cover 2 is locked into a closed position by means of locking lever means 13, provided at opposite sides of the front portion of cover 2. Locking is effected through locking pins 14 which are located on fixed section 1.

Fixed unit 1 further includes a stepping motor 15 for turning platen 4 and rollers 7 and 8 which, as previously mentioned, pull backing sheet S along.

A transmission gear 17, located in cover 2, meshes with platen gear 16 which is in turn concentrically located relative to platen 4. Thus motive power is transmitted to wind carbon ribbon C synchronously with the rotation of platen 4.

Figure 2:
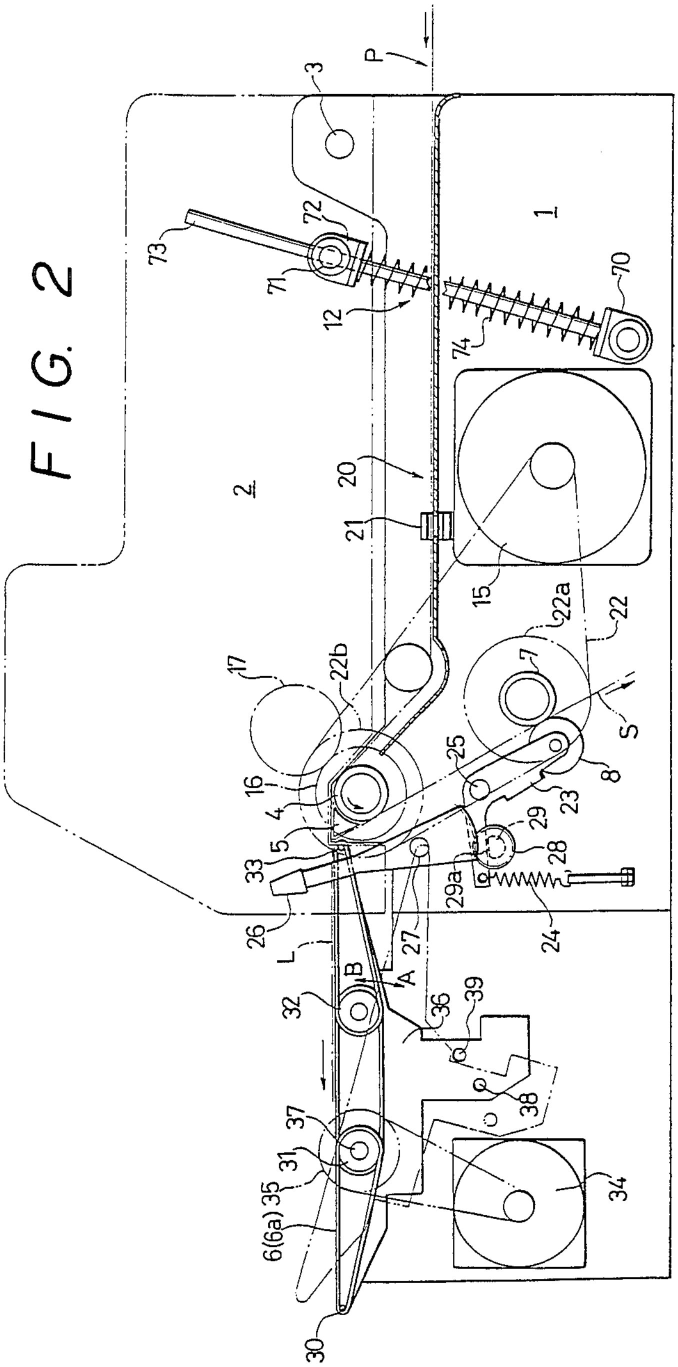
FIG. 2 is a section side view of a stationary sectional of the embodiment of FIG. 1.

Further details of fixed unit 1 are apparent from FIG. 2. Label strip P, which is supplied from a label strip roll support means (not shown), enters at the rear through a space between fixed unit 1 and cover 2. It is then guided along a label strip passage 20 to pass between platen 4 and thermal head 9. Position sensor 21 located over the label strip passage is adapted to sense the position of label strip P. Stepping motor 15 drives roller 7 and platen gear 16 of platen 4 and is coupled thereto by timing belt 22 and pulleys 22*a* and 22*b*.

Follower roller 8 is rotatably mounted on one end of pivot member 23. Pivot member 23 is urged by means of spring 24 to rotate counterclockwise about shaft 25. As a result follower roller 8 presses backing sheet S against drive roller 7. To install backing sheet S in position, open lever 26 is operated to pivot clockwise about shaft 27. This causes gear 28 which is in mesh with the lower end of open lever 26 to rotate counterclockwise. In consequence of the foregoing, displacement shaft 29 which is integral with gear 28, rotates so that the flat portion 29*a* of displacement shaft 29 pushes pivot member 23 up, thereby creating a clearance between rollers 7 and 8.

Label conveyor belt 6 is constituted of an aggregation of numerous endless belts 6*a*. Belt 6 serves to carry labels L, which have been printed and peeled off by label peeling member 5 (FIG. 3), out through the front of the device. Those endless belts 6*a* which are located nearer the front of label conveyor belt 6 are mounted on shafts 30 and 31. A next group of belts is mounted on shafts 31 and 32 and a rearmost group of belts is mounted on shafts 32 and 33. All the belts are rotated in one direction by pulley 35 which is driven by motor 34.

Figure 3:
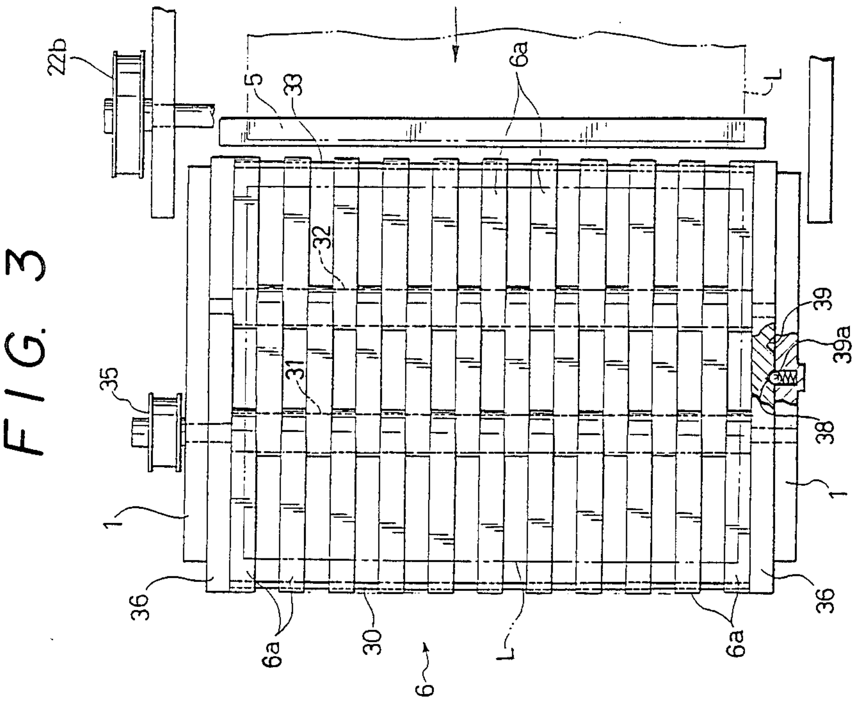
FIG. 3 is a plane view of a portion of a conveyor belt of the above embodiment.

Label conveyor belt 6 is entirely supported by conveyor belt frame 36. Thus it is capable of being swung open or closed about shaft 37, as indicated by the adjacent arrow. Open and closed position stops for belt 6 are denoted respectively by numerals 38 and 39. In this arrangement, as shown in FIG. 3, conveyor belt frame 36 is provided on the inner side thereof with a spring which urges a steel ball 39*a* inwardly and into engagement at one of the stop positions to thereby hold the conveyor belt frame 36 in position.

Figure 4:
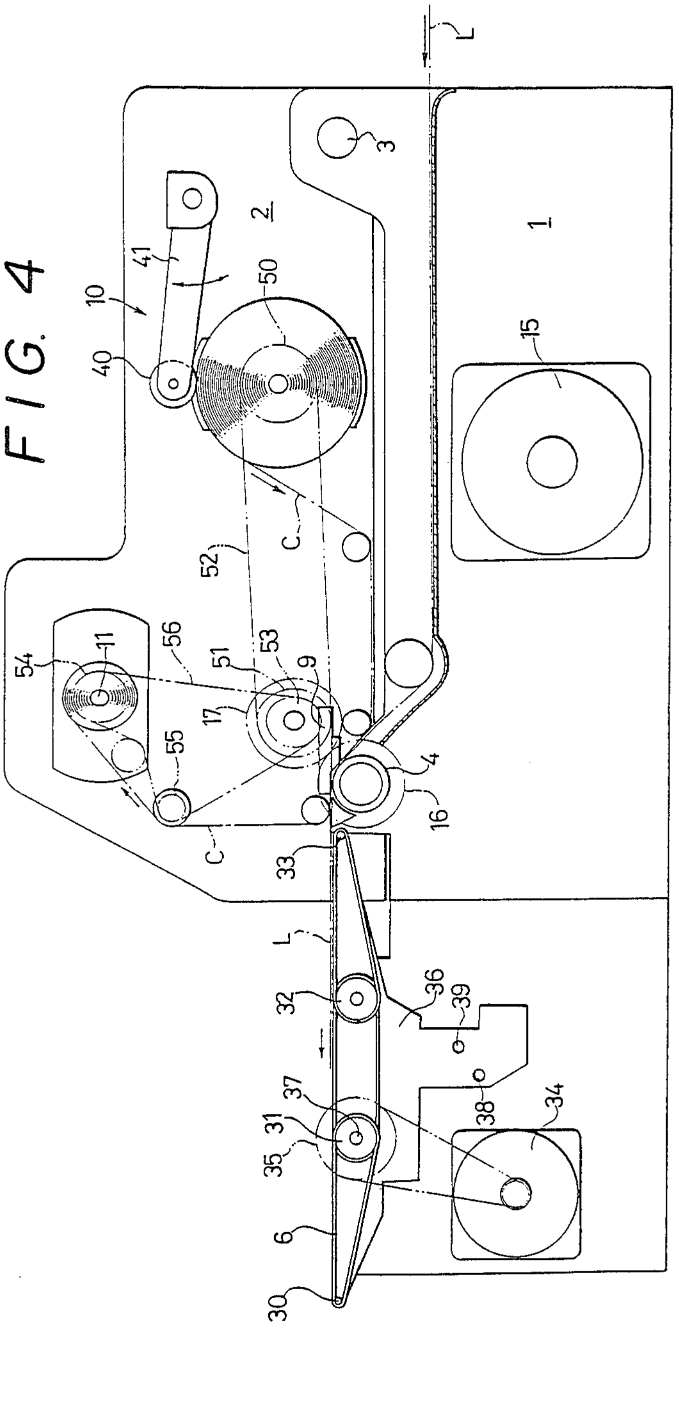
FIG. 4 is a sectional view of a cover of the embodiment of FIG. 1.

For further details of cover 2 reference is made to FIG. 4. In a carbon ribbon feeder 10 a roller 40 on an arm 41 applies a predetermined pressure against carbon ribbon C to assure that carbon ribbon C is dispensed with uniform tension. A pulley 50 which supports carbon ribbon C is coupled by means of round belt 52 to pulley 51 disposed on transmission gear 17. This exerts a back-tension on carbon ribbon feeder 10 and takes up any slack in carbon ribbon C. A pulley 53 which is concentrically disposed with transmission gear 17 is linked by round belt 56 to pulley 54 associated with carbon ribbon take-up means 11 and with intermediate pulley 55. In the closed position of cover 2, transmission gear 17 meshes with gear 16 of platen 4, and permits stepping motor 15 to drive take-up means 11.

Figure 5:
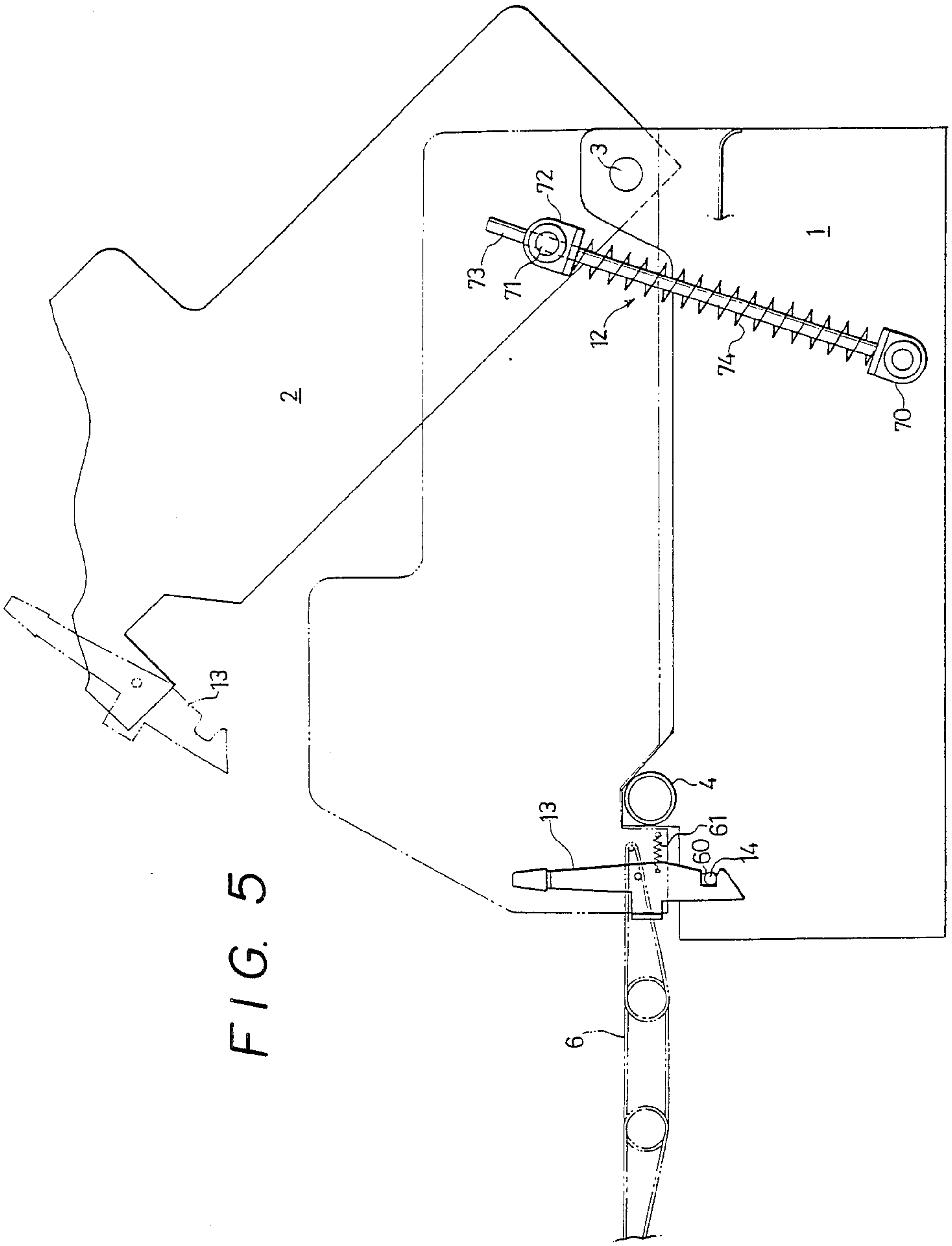
FIG. 5 is introduced for aiding explanation of a closing means and an open-urging means for the above embodiment.

As seen in FIG. 5 open lever 13 is disposed at each side of cover 2 at the front portion thereof in a manner which is effective to secure cover 2 in its closed state through the engagement of closing engagement pin 14 on fixed unit 1 with the cutout portion 60 provided at the lower end of open lever 13.

In the closed position, platen gear 16 and transmission gear 17 mesh and driving power can be transmitted from the drive source (stepping motor 15). If open lever 13 is urged counterclockwise against the pulling force of spring 61, the cutout portion 60 is disengaged from pin 14 and open-urging means 12 are enabled to push cover 2 open and away from fixed unit 1.

As shown in FIG. 5, open-urging means 12 includes support member 70 on fixed unit 1 and support member 72 on cover 2. Support rod 73 passes through support member 72 with enough flexibility so that cover 2 is urged clockwise in response to the force exerted by spring 74. The foregoing structure of open-urging means 12 is provided on both sides of fixed unit 1.

Figure 6:
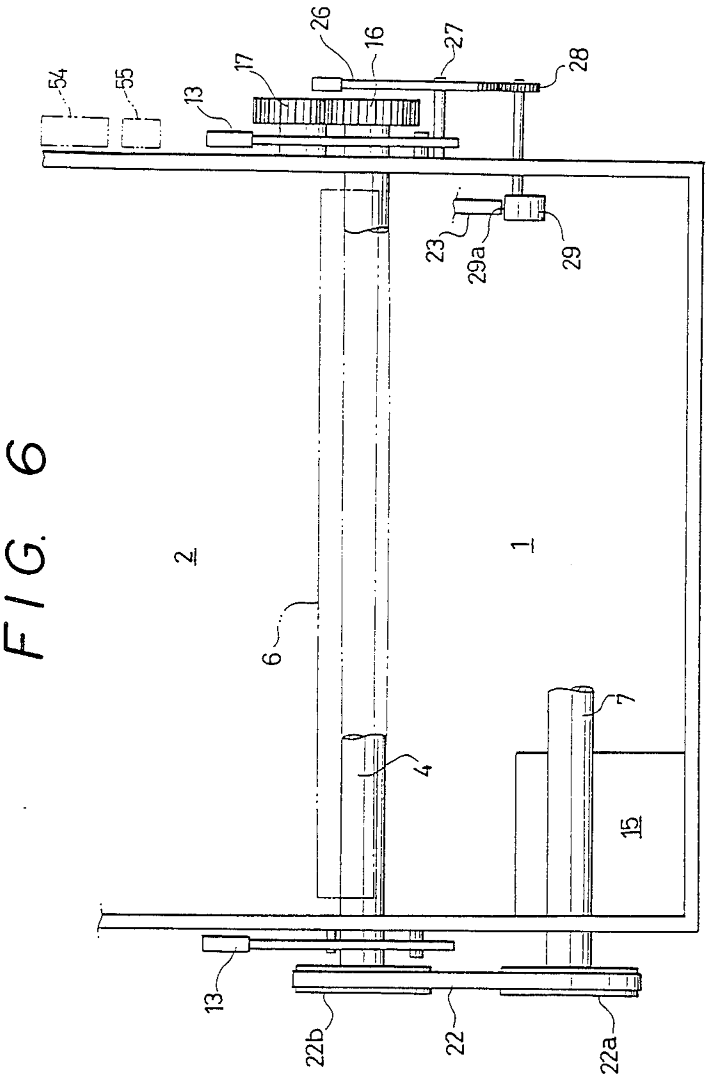
FIG. 6 provides a view which facilitates explanation of the positional relationship of the drive transmission means of the present invention.

The positional relationship between the various driving and rotating means of the present invention is depicted in FIG. 6 which provides a view along arrow VI of FIG. 1. Stepping motor 15 and its pulleys 22*a* and 22*b* are at the left in FIG. 6. At the right are open lever 26, the backing sheet support means, and the means for transmitting rotational force from stepping motor 15 to platen 4 and to carbon ribbon take-up means 11. Construction details relating to the foregoing components were previously described.

In operation, thermal label strip P travels through the printer to be printed with required information as it passes between the thermal print head 9 and platen 4. Backing sheet S is redirected at label peeling member 5 toward rollers 7 and 8 which grip, pull, and eject backing sheet S. The peeled printed labels L are conveyed along by conveyor belt 6, from which they can be automatically picked up by a label lifting member (not shown) and adhered to goods such as cartons (not shown) or the like. Or, labels L may be applied by hand.

In the process of loading backing sheet S between rollers 7 and 8, an upward force from a fingertip or the like is applied against the under-part of shaft 30. As a result conveyor belt frame 36 is pivoted in the direction of the arrow A to the dotted line position shown in FIG. 2. A space is thus created between conveyor belt 6 and label peeling member 5, facilitating snaking of backing sheet S past label peeling member 5. Thereafter the open lever 26 is operated to separate rollers 7 and 8 to position the free end of backing sheet S therebetween. Loading of backing sheet S is completed by releasing lever 26 and thereafter pressing down on shaft 30 of conveyor belt 6 to rotate conveyor belt frame 36 in the direction of arrow B back to its original position.

If the need exists to supply unpeeled labels L, backing sheet S is simply guided onto conveyor belt 6 and the steps of guiding backing sheet S towards rollers 7 and 8 are dispensed with.

To load carbon ribbon C, open lever 13 (FIG. 5) is turned clockwise to disengage cutout 60 and pin 14. Spring 74 of open-urging means 12 is then free to urge cover 2 open which action exposes the lower surface of the carbon ribbon pay-out means 10 and take-up means 11. The upper faces or sides of the foregoing means 10 and 11 provide accessibility which permits loading of carbon ribbon C and cleaning, checking and maintaining the print head, platen and other interior parts and components of the thermal printer of the present invention.

To summarize, the label feed device of the present invention provides a ready ability to switch between modes wherein either peeled or unpeeled labels are supplied. The unique structure of the printer eases the task of handling large labels and facilitates carrying out inspection and maintenance of the redirecting (peeling) member and other parts and components.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A thermal label printer comprising:

a print head for printing data on labels and means for conveying an elongated backing sheet supporting the labels which are detachably adhered to the backing sheet past the print head;

a peeling member located past the print head along a travel direction of the backing sheet, the peeling member having a configuration which causes the labels to peel off the backing sheet when the travelling direction of the backing sheet changes sharply as the backing sheet travels past the peeling member; and conveyor belt means extending to the peeling member for carrying printed labels out of the thermal printer, the conveyor belt means including means for adjusting the position of the conveyor belt means relative to the peeling member to create a clearance which facilitates loading and insertion of the backing sheet between the peeling member and the conveyor belt means.

2. The printer of claim 1 in which the travelling direction of the backing sheet changes by more than 90° as it travels past the peeling member.

3. The printer of claim 1 in which the conveyor belt means are located close enough to the peeling member to leave only a tight clearance for the backing sheet.

4. The printer of claim 3 in which the conveyor belt means comprise a plurality of endless belts.

5. The printer of claim 4 in which the conveyor belt means comprises a shaft around which the conveyor belt means is rotatable and means for tilting the conveyor belt means about the shaft in a manner which is effective to enlarge the clearance between the conveyor belt means and the peeling member.

6. The printer of claim 1 further comprising a drive support roller and a follower support roller located forward of the peeling member along the travel direction of the backing sheet and means for urging the rollers into rolling contact with one another, the backing sheet being received between the rollers and being pulled by capstan action created therebetween.

7. The printer of claim 6 in which the drive support roller is stationery and the follower roller is coupled to the urging means.

8. The printer of claim 7 further comprising means for pulling the rollers apart to create a temporary clearance for facilitating loading of the backing sheet between the rollers.

9. The printer of claim 8 in which the pulling means include a human actuatable and exteriorly accessible pivot lever for activating the pulling means.

10. The printer of claim 1 which comprises a fixed unit, a cover, locking means for locking the fixed unit to the cover and open-urging means for urging the cover away from the fixed unit when the locking means are in a deactivated state.

11. The printer of claim 10 which comprises pivot means for attaching the cover to the fixed unit, the pivot means being located so that the cover is pivotable with respect to the fixed unit about the pivot means.

12. The printer of claim 11 in which the open-urging means comprises a first support member affixed to the fixed unit, a second support member affixed to the cover and a rod and spring mechanism extending between the first and second support members which are configured to resiliently bias the first support member away from the second support member.

13. The printer of claim 6 in which the printer is operable in a first mode in which the backing sheet is received by the rollers so that the conveyor belt means supply peeled labels and in a second mode in which the backing sheet, still containing the labels adhered thereto, is delivered from the printer by way of the conveyor belt means thereby to supply printed unpeeled labels.

* * * * *